United States Patent
Pettovello (10) Patent No.: US 9,946,744 B2
(45) Date of Patent: Apr. 17, 2018

(54) CUSTOMER VEHICLE DATA SECURITY METHOD

(71) Applicant: General Motors LLC, Detroit, MI (US)

(72) Inventor: Primo Mark Pettovello, Canton Township, MI (US)

(73) Assignee: General Motors LLC, Detroit, MI (US)

(*) Notice: Subject to any disclaimer, the term of this patent is extended or adjusted under 35 U.S.C. 154(b) by 63 days.

(21) Appl. No.: 14/989,364

(22) Filed: Jan. 6, 2016

(65) Prior Publication Data

US 2017/0193026 A1   Jul. 6, 2017

(51) Int. Cl.
| | |
|---|---|
| G06F 17/30 | (2006.01) |
| H04L 9/14 | (2006.01) |
| G06F 12/14 | (2006.01) |
| G06F 21/00 | (2013.01) |
| G06F 21/62 | (2013.01) |

(52) U.S. Cl.
CPC .... *G06F 17/30339* (2013.01); *G06F 12/1408* (2013.01); *G06F 21/00* (2013.01); *G06F 21/6254* (2013.01); *H04L 9/14* (2013.01); *G06F 2212/1052* (2013.01); *G06F 2212/402* (2013.01)

(58) Field of Classification Search
CPC ........... G06F 17/30339; G06F 12/1408; G06F 2212/1052; G06F 2212/402; H04L 9/14
See application file for complete search history.

(56) References Cited

U.S. PATENT DOCUMENTS

| | | | | |
|---|---|---|---|---|
| 5,721,915 A * | 2/1998 | Sockut | ............ | G06F 17/30339 |
| 5,974,574 A * | 10/1999 | Lennie | ................ | G06F 11/1451 |
| | | | | 714/52 |
| 5,995,965 A * | 11/1999 | Experton | ............. | G06F 19/322 |
| | | | | 707/959 |
| 6,272,637 B1* | 8/2001 | Little | .................. | G06F 12/1408 |
| | | | | 380/52 |
| 7,111,005 B1* | 9/2006 | Wessman | ............. | G06F 21/604 |
| 7,783,896 B2* | 8/2010 | Little | .................. | G06F 21/6218 |
| | | | | 713/189 |
| 7,900,245 B1* | 3/2011 | Geddes | ............... | H04L 63/0407 |
| | | | | 713/159 |
| 8,458,487 B1* | 6/2013 | Palgon | .................... | G06F 21/00 |
| | | | | 380/277 |
| 8,522,050 B1* | 8/2013 | Wakerley | ............ | H04L 67/1097 |
| | | | | 713/193 |

(Continued)

*Primary Examiner* — Jung Kim
*Assistant Examiner* — James J Wilcox
(74) *Attorney, Agent, or Firm* — David Willoughby; Reising Ethington P.C.

(57) ABSTRACT

A database system and method for managing and storing sensitive and non-sensitive vehicle data. Received vehicle data messages are processed to separate out sensitive and non-sensitive data. The data is stored in a database having: an encrypted table, a plain-text table, and an identification mapping table. The encrypted table contains the sensitive data entries in an encrypted format. The plain-text table contains the non-sensitive data entries in a plaintext form. The identification mapping table contains a plurality of mapping data entries, wherein each mapping data entry associates a unique identifier to an affiliated identifier that is used to recall data from the encrypted table and the plain-text table.

16 Claims, 2 Drawing Sheets

(56) References Cited

U.S. PATENT DOCUMENTS

| | | | | |
|---|---|---|---|---|
| 8,819,068 B1* | 8/2014 | Knote | G06F 17/30339 | 707/790 |
| 9,584,502 B1* | 2/2017 | Manoukis | H04W 4/046 | |
| 9,720,849 B2* | 8/2017 | Amarendran | G06F 12/1408 | |
| 2002/0078049 A1* | 6/2002 | Samar | G06F 21/6218 | |
| 2005/0129235 A1* | 6/2005 | Little | G06F 12/0253 | 380/255 |
| 2006/0262928 A1* | 11/2006 | Bar-El | G06F 21/78 | 380/228 |
| 2008/0008116 A1* | 1/2008 | Buga | H04L 41/046 | 370/328 |
| 2008/0195802 A1* | 8/2008 | Lee | G06F 12/0246 | 711/103 |
| 2009/0019534 A1* | 1/2009 | Bakshi | G06F 21/335 | 726/6 |
| 2009/0103533 A1* | 4/2009 | Li | H04L 41/0226 | 370/389 |
| 2009/0316887 A1* | 12/2009 | Lee | G06F 17/30533 | 380/44 |
| 2010/0229005 A1* | 9/2010 | Herman | G06F 12/1408 | 713/193 |
| 2011/0153652 A1* | 6/2011 | Yun | G07C 5/008 | 707/769 |
| 2011/0307486 A1* | 12/2011 | Breslau | G06F 21/6245 | 707/737 |
| 2013/0166138 A1* | 6/2013 | Yun | G07C 5/0841 | 701/32.6 |
| 2013/0205136 A1* | 8/2013 | Kirsch | H04L 63/0869 | 713/168 |
| 2013/0232105 A1* | 9/2013 | Moser | H04L 67/2823 | 707/602 |
| 2014/0068279 A1* | 3/2014 | Kurspahic | H04L 9/0894 | 713/193 |
| 2015/0215294 A1* | 7/2015 | Manges | H04L 9/14 | 713/171 |
| 2015/0363606 A1* | 12/2015 | Nairn | G06F 21/78 | 701/32.6 |
| 2015/0371457 A1* | 12/2015 | Bakfan | G07C 5/0841 | 701/29.3 |
| 2016/0019396 A1* | 1/2016 | Davis | G06F 21/6209 | 713/193 |
| 2016/0035148 A1* | 2/2016 | Huang | H04L 9/0866 | 701/31.4 |
| 2016/0078245 A1* | 3/2016 | Amarendran | G06F 21/6218 | 713/193 |
| 2016/0148449 A1* | 5/2016 | God | G07C 9/00087 | 340/5.6 |
| 2016/0191470 A1* | 6/2016 | Movalia | H04L 63/061 | 713/171 |
| 2016/0275309 A1* | 9/2016 | Austin | G06F 19/322 | |
| 2016/0294818 A1* | 10/2016 | Badam | H04L 63/0853 | |
| 2016/0314157 A1* | 10/2016 | Xiao | G06F 21/6227 | |
| 2016/0352695 A1* | 12/2016 | Kozolchyk | H04L 9/3239 | |
| 2017/0085385 A1* | 3/2017 | Kilduff | G06F 17/30011 | |
| 2017/0187531 A1* | 6/2017 | Iyengar et al. | H04L 9/32 | |
| 2017/0220691 A1* | 8/2017 | Oulmane | G06F 17/30339 | |
| 2017/0324558 A1* | 11/2017 | Takemori | H04L 9/3226 | |

* cited by examiner

*Figure 1*

CUSTOMER VEHICLE DATA SECURITY METHOD

TECHNICAL FIELD

The present disclosure relates to centralized vehicle data management and, more particularly, to managing storage of large amounts of vehicle data that includes both sensitive and non-sensitive data.

BACKGROUND

With a growing number of computers, there is a growing amount of data that is recorded. Electronic data-producing devices have been incorporated into many everyday objects. One such object is the automobile or vehicle. Many vehicles have numerous installed electronic devices that produce data about the vehicle and/or characteristics or attributes of the vehicle. This data may be communicated back to a central facility or facilities wherein the data is stored in a database. Some of the information that may be sent back to these central facilities may be sensitive information, or a combination of different data may be deemed sensitive if, when viewed together, the data reveals some personal data that is normally not public about the vehicle, or an owner, operator, or user of the vehicle. The communications to and from the central facilities may be secured via encryption, including encrypting the databases themselves. However, much of this transmitted data is non-sensitive and, therefore, encryption of the entire database, including this non-sensitive information, is unnecessary and costly in terms of computing time and resources.

SUMMARY

According to an embodiment of the invention, there is provided a method of operating a database stored on one or more computers, wherein the database comprises: an identifier mapping table that contains mapping data entries wherein each mapping data entry associates a unique identifier with an affiliated identifier; a plaintext table that contains non-sensitive data entries; and an encryption table that contains sensitive data entries; and wherein the method comprises the steps of: receiving a data message, wherein the data message contains a unique identifier; providing an affiliated identifier to be associated with the unique identifier; selecting to store at least part of the data message and the affiliated identifier in the plaintext table, in the encrypted table, or in both; storing at least part of the data message and the affiliated identifier in the selected table(s); storing a new mapping data entry in the identifier mapping table, wherein the new mapping data entry contains the unique identifier and the affiliated identifier; encrypting the identifier mapping table using a first encryption key; and writing the encrypted identifier mapping table to a non-volatile, computer-readable medium.

According to another embodiment of the invention, there is provided a database system, comprising a database stored on a computer-readable medium, comprising: an encrypted table, wherein the encrypted table contains a plurality of sensitive data entries, wherein each sensitive data entry contains sensitive information and is in an encrypted format; a plain-text table, wherein the plain-text table contains a plurality of non-sensitive data entries, wherein each non-sensitive data entry is in a plaintext form; and an identification mapping table, wherein the identification mapping table contains a plurality of mapping data entries, wherein each mapping data entry associates a unique identifier to an affiliated identifier that is used to recall data from the encrypted table and the plain-text table. The system also comprises a computer, wherein the computer comprises a processor, memory, and a computer-readable medium; and an application that is stored on the computer, wherein the application manages input and output operations performed by the computer for the database in response to receiving data.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

With today's vehicles, there is a great amount of data generated by or otherwise acquired at the vehicle and then transmitted back to a data center or other central facility. The total amount of data stored at these facilities may become enormous such that operating on that data becomes costly. Databases that store such large amounts of data may be managed and/or designed so as to reduce the time it takes to store, retrieve, delete, or update a data record. Additionally, databases and/or the data therein may be encrypted such that the confidentiality of the encrypted information may be preserved. However, encryption may be very costly due to the amount of additional operations the computer must perform. Therefore, the system and methods described below enable grouping of data into sensitive and non-sensitive portions such that the amount of data to be encrypted (and later, decrypted) may be drastically reduced. This permits greater operational efficiency in managing and using the databases, especially for use of the non-sensitive data in subsequent analytical processes.

Such a system and methods are provided herein that allow for operation a database that is stored on one or more computers. The database contains at least three tables: the identifier mapping table (IMT or mapping table), the plain-text table, and the encrypted table. As will be explained in greater detail below, these three tables are used in conjunction with one another such that sensitive information is encrypted, while then non-sensitive information is not necessarily encrypted. Herein, "sensitive" information or data means any information or data that may reveal personally identifying information, personal information, confidential information, non-public information, or any information for which it is desired to be kept encrypted. And, herein, "non-sensitive" information or data means any information or data that is not "sensitive," as defined above.

System—

Figure 1:
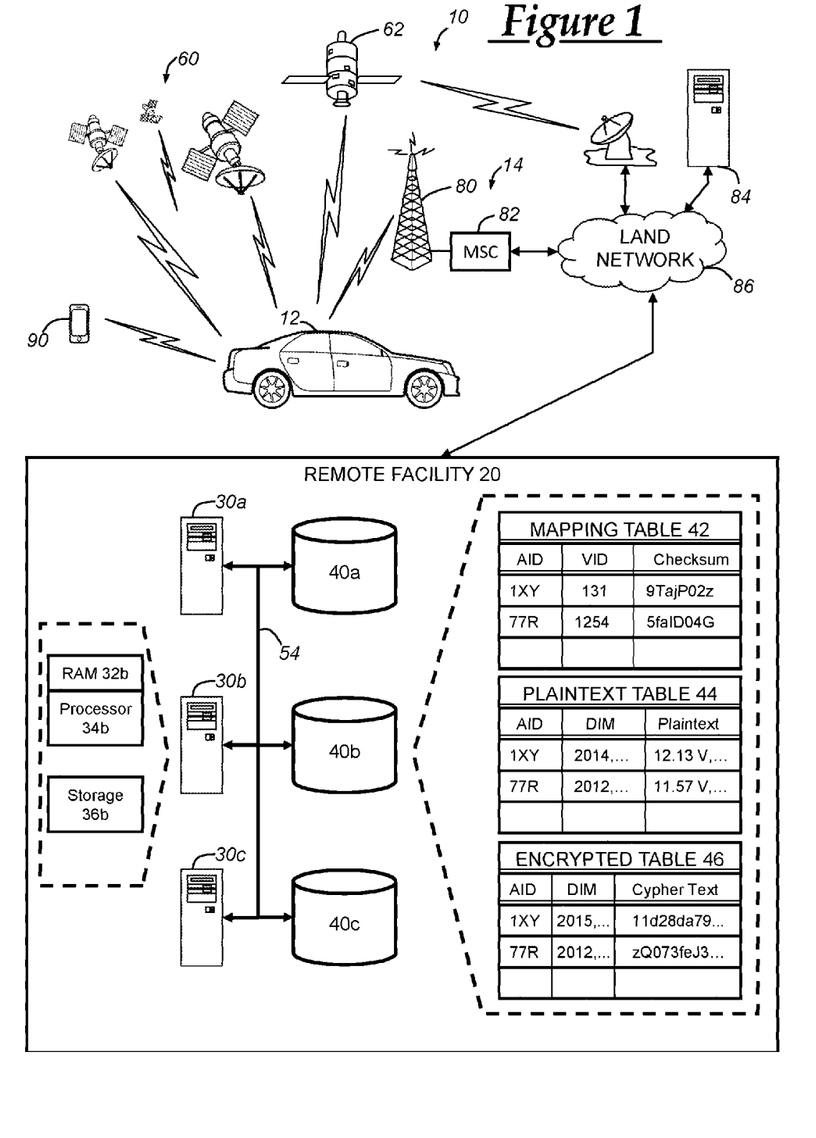
FIG. 1 is a block diagram depicting a database system that can be used for carrying out a method of operating a database stored on one or more computers.

With reference to FIG. 1, there is shown an operating environment that comprises a database system 10 and that can be used to implement the method disclosed herein. Database system 10 generally includes a vehicle 12, one or more wireless carrier systems 14, a land communications network 86, a computer 84, and a remote facility 20. It should be understood that the disclosed method can be used with any number of different systems and is not specifically limited to the operating environment shown here. Also, much of the architecture, construction, setup, and operation of the system 10 and its individual components are generally known in the art. Thus, the following paragraphs simply provide a brief overview of one such system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Vehicle 12 contains vehicle electronics that may be used for a myriad of different functions. Vehicle 12 may also include a telematics unit that can communicate with wireless carrier system 14, device 90, GPS satellites 60, and/or other network devices. Vehicle 12 may include at least one computer, wherein the at least one computer can collect, compile, measure, or otherwise obtain information relating to the vehicle, environment, operators, or passengers. The vehicle may then, through telematics unit 30, or other wireless communications path, send this information to remote facility 20 via wireless carrier system 14 (via cell tower 80, mobile switching center (MSC) 82, and land network 86). In addition to transmitting information to one or more networks via carrier system 14, vehicle 12 may receive information via system 14 through the same channels upon which it transmits data.

Wireless carrier system 14 is preferably a cellular telephone system that includes a plurality of cell towers 80 (only one shown), one or more mobile switching centers (MSCs) 82, as well as any other networking components required to connect wireless carrier system 14 with land network 86. Each cell tower 80 includes sending and receiving antennas and a base station, with the base stations from different cell towers being connected to the MSC 82 either directly or via intermediary equipment such as a base station controller. Carrier system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and transmitting station 64. If used, this satellite telephony can be utilized either in addition to or in lieu of wireless carrier system 14.

Land network 86 may be a conventional land-based telecommunications network that is connected to one or more landline telephones and connects wireless carrier system 14 to remote facility 20. For example, land network 86 may include a public switched telephone network (PSTN) such as that used to provide hardwired telephony, packet-switched data communications, and the Internet infrastructure. One or more segments of land network 86 could be implemented through the use of a standard wired network, a fiber or other optical network, a cable network, power lines, other wireless networks such as wireless local area networks (WLANs), or networks providing broadband wireless access (BWA), or any combination thereof. Furthermore, remote facility 20 need not be connected via land network 86, but could include wireless telephony equipment so that it can communicate directly with a wireless network, such as wireless carrier system 14.

Computer 84 can be one of a number of computers accessible via a private or public network such as the Internet. Each such computer 84 can be used for one or more purposes, such as a web server accessible by the vehicle via the vehicle's telematics unit and wireless carrier 14. Other such accessible computers 84 can be, for example: a service center computer where diagnostic information and other vehicle data can be uploaded from the vehicle via the telematics unit; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or remote facility 20, or both. A computer 84 can also be used for providing Internet connectivity such as DNS services or as a network address server that uses DHCP or other suitable protocol to assign an IP address to the vehicle 12.

Remote facility 20 is designed to acquire and store data that is received from vehicle 12. Remote facility 20 may also send data to vehicle 12 and/or provide the vehicle with a number of different system back-end functions. The remote facility generally includes computers 30, database 40, and communications bus 54, wherein bus 54 allows for a local interconnected network or the like (e.g., LIN, LAN) such that computers 30a-c may communicate with each other and with databases 40a-c. Computers 30a-c may store the information or data received or compiled into databases 40a-c. Data communications with external networks, such as land network 86, may be implemented via a modem (not shown). Data messages are passed via the modem to computers 30a-c and/or databases 40a-c. Databases 40a-c can store account information such as subscriber authentication information, vehicle identifiers, profile records, behavioral patterns, and other pertinent subscriber information, all of which may include sensitive and/or non-sensitive data. Data transmissions may also be conducted by wireless systems, such as 802.11x, GPRS, and the like.

Computers 30a-c can be one of a number of computers accessible via a private or public network such as the Internet. Although there are only three shown, there may be any number of computers at remote facility 20. Each such computer 30a-c is used to maintain and manage database 40a-c, as well as for retrieving, storing, aggregating, and operating on data. Computers 30a-c, in some embodiments, preferably use a relational database management system for performing the previously identified functionality with respect to the databases. In addition, computers 30a-c can be used for one or more other purposes, such as a web server accessible by the vehicle via the vehicle's telematics unit and wireless carrier 14. Computers 30a-c each contain RAM (random access memory) 32a-c (only 32b shown), processor 34a-c (only 34b shown), storage 36a-c (only storage 36b shown), and may include any other devices, components, or modules known to those skilled in the art. Further, computers 30a-c may act as a load balancer or may perform computations other than those needed to store and retrieve data from databases 40a-c. Alternatively, or additionally, computers 30a-c may be closely coupled or wired to databases 40a-c such that they act as dedicated database servers.

Processor 34 can be any type of device capable of processing electronic instructions including microprocessors, microcontrollers, host processors, controllers, vehicle communication processors, and application specific integrated circuits (ASICs). It can be a dedicated processor used only for computer 30 or can be shared with other vehicle systems. Processor 34 executes various types of digitally-stored instructions, such as software or firmware programs stored in storage 36 (e.g., HDD, SSD), which enable the computer to provide a wide variety of services. Processor 34 is coupled with RAM 32 such that it may store information for immediate use by the processor. For instance, processor 34b in conjunction with RAM 32b can execute programs or process data to carry out at least a part of the method discussed herein.

RAM 32 is the primary memory for computer 30 and may be SRAM (static RAM) or DRAM (dynamic RAM). As stated above, the RAM is primarily used to give processor 34 fast access to information. The RAM may be any size and, additionally, may be used to employ a virtual memory scheme thereby allowing the processor to operate on amounts of data larger than the amount of RAM available. Although RAM is considered volatile (i.e. upon shut down or loss of power, the RAM loses the data stored therein), new developments have been initiated such that RAM may be non-volatile, while still providing comparable access speed. This or any other memory that can provide access and store information such that processor 34 may operate quickly therewith may be used in lieu or in conjunction with typical RAM.

Storage 36 may be any computer-readable medium or memory device that is non-volatile such that information stored therein is retained when power is loss. For example, storage 36 may be one or more hard disk drives (HDDs), solid state drives (SSDs), or combination thereof. Storage 36 may store information, data, or instructions, such as software applications, for use by processor 34. For example, storage 36 may store the relational database management system (RDBMS) that processor 34 will use to maintain, manage, or otherwise interact with databases 40a-c. Additionally, storage 36 may include databases 40a-c themselves.

Databases 40a-c may be stored in storage 36 as indicated above, or may be stored on storage devices elsewhere. In the case where the databases 40a-c are not stored in storage 36a-c, the databases may have their own dedicated storage media. In this case, databases 40a-c may have a separate server or computer coupled thereto such that information may be retrieved from and stored into databases 40a-c. These separate database servers or computers may then communicate with computers 30a-c via communication bus 54. This is but one configuration. In the configuration shown, the databases are connected to bus 54 and may pass information to and from computers 30a-c.

Databases 40a-c may be separate databases wherein they are part of different relational models, may be part of the same relational model, or may be identical copies of one another for purposes of redundancy. Regardless of the specific configuration, databases 40a-c may contain any number of tables. However, as depicted, database 40b contains at least three tables: mapping table 42, plaintext table 44, and encrypted tabled 46. Database 40b (as well as databases 40a and 40c) may be operated according to a relational database management system (RDBMS), such as MySQL. This RDBMS may be stored on computers 30 and/or may be stored at a computer that serves as a database server that is closely coupled or integrated with the database. The RDBMS may send data to other systems or computers to be processed and may receive information therefrom and store it into database 40b.

Mapping table (or identifier mapping table) 42 is shown as containing three columns (VID, AID, and Checksum), however, it may contain two or more columns (e.g., VID and AID only; VID, AID, Checksum, Time, Make, and Model). The VID is a vehicle identifier and, herein, vehicle identifier or VID means any string, collection, or array of bytes or characters that may be used to identify a certain vehicle (e.g., VIN (vehicle identification number)). In another embodiment, the VID may be another identifier that does not necessarily relate to a vehicle. AID is an affiliated identifier and, herein, affiliated identifier or AID means any string, collection, or array of bytes that may be used in associating data from other tables (e.g., plaintext table 44, encrypted table 46) with the corresponding VID, and does not necessarily have to be unique (i.e. multiple data messages may have the same affiliated identifier). The VID, AID, combination thereof, or combination of a timestamp or other information and the VID or AID may be the primary key for the table. In addition, the VID and AID may be foreign keys, such that they may be used to associate data from two or more tables. The checksum column may or may not be implemented by mapping table 42 and will be discussed below.

Plaintext table 44 is a database table that comprises at least two columns (one being the "AID" column); however, it may contain more than two columns, such as three columns, as depicted. The "AID" column may be a primary key for the table; alternatively, the AID in combination with other data (e.g., a timestamp) may be the primary key for the table. In addition, the AID can be a foreign key such that it can be used to associate the data in the plaintext table with data in the mapping or encryption table. The "DIM" column shown is a dimension column that may store vehicle information, such as the make, model, or model year. There may be any number of dimension columns. The "Plaintext" column is used to store the non-sensitive data that is received by computers 30 from vehicle 12. Although this table contains primarily non-sensitive data, it may be encrypted such that if one or more other tables are compromised, the information stored in the plaintext table may be protected so that it may not be combined with information in the compromised tables.

Encrypted table 46 is a database table and is similarly situated as that of the plaintext table. The encrypted table contains an "AID" column that may be a primary key, or other columns or combination of columns may serve as a primary key. The AID can be a foreign key such that it can be used to associate the data in the encrypted table with data in the mapping or plaintext table. The "DIM" column may be that which was described above with respect to plaintext table 44. The "Cypher Text" column is similar to the "Plaintext" column described above with respect to plaintext table; however, the "Cypher Text" column contains encrypted information. The encrypted information may consist of sensitive data or a sensitive combination of data. The encrypted table itself may be encrypted as well, such that the data in the "Cypher Text" column has two layers of encryption.

Figure 2:
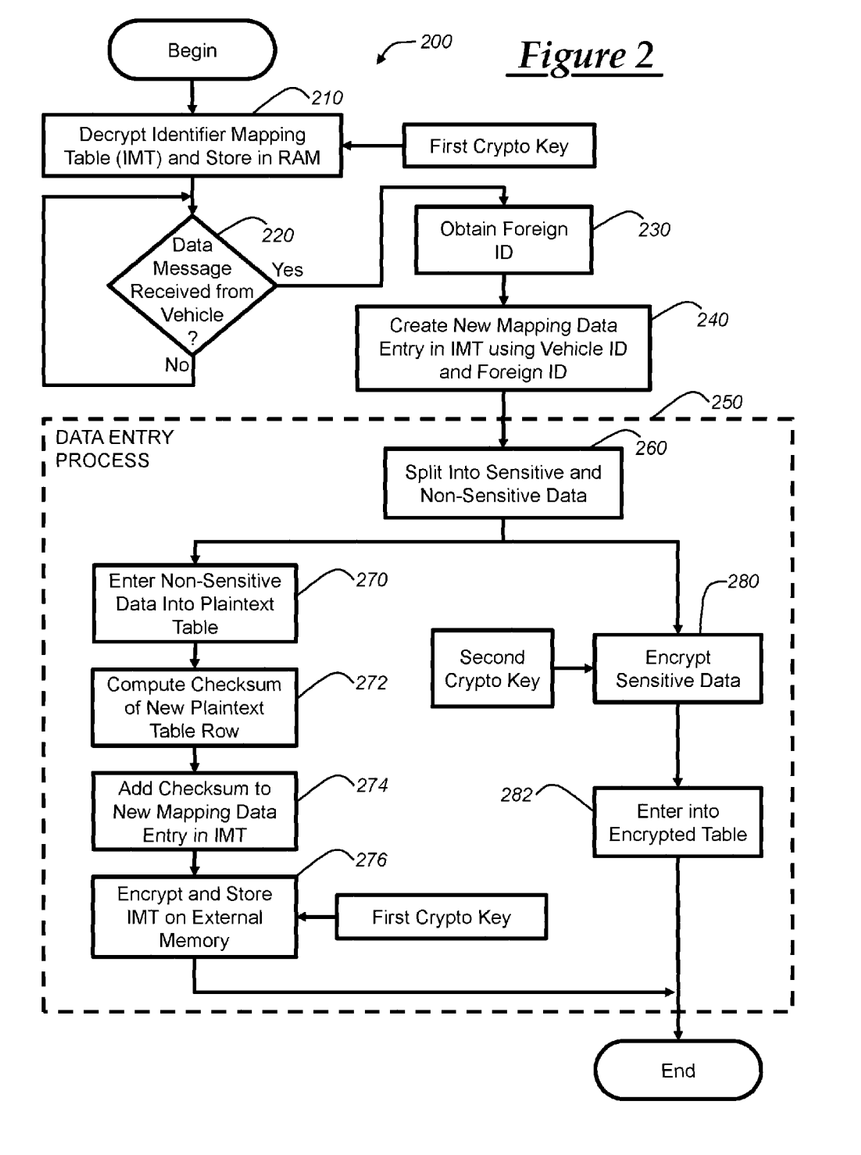
FIG. 2 is a flowchart illustrating a method of operating a database stored on one or more computers.

Referring now to FIG. 2, method 200 beings with step 210. In step 210, identifier mapping table 42 is decrypted and stored into RAM (random access memory). In one embodiment, a database server may serve the mapping table from database 40a, 40b, and/or 40c to computer 30a, 30b, and/or 30c. For example, upon mapping table 42 being served to computer 30b, the computer may store the database in RAM 32b, storage 36b, or both. In the case that the mapping table is stored in storage 36b, the data may be passed to RAM 32b such that processor 34b may operate upon it. In the case where the mapping table is larger than the amount of RAM allocated thereto, a portion of the table may be stored in RAM and the rest in storage 36b, or in RAM or storage of computers 30a and/or 30c. Also, in this case, the operating system of computer 30b may implement a virtual memory scheme.

Before, during, or after the mapping table is passed to computer 30b, the table may be decrypted such that it may be read and properly modified by computers 30a-c. Decryption may be implemented using a symmetric key encryption scheme or a public key encryption scheme. For purposes of illustration and explanation, the mapping table is described herein as using a first cryptographic key according to a symmetric key encryption scheme such that encryption and decryption use the same first cryptographic key. Decryption may be performed by a database server, computers 30a-c, or any other computing system. Similarly, the first encryption key may be stored at remote facility 20 in a computer, such as computers 30a-c, may be manually typed into a computer by a person, or may be stored on a USB flash-drive that is inserted into a USB port of computer 30a-c or the computing device that is performing the decryption. In any event, after the mapping table is decrypted and stored into RAM, the method continues to step 220.

In step 220, the one or more computers 30 at the remote facility stand ready to receive messages via, e.g., land network 86. The messages may have any origin, but in the illustrated embodiment, the data messages are received from vehicle 12 via carrier system 14 and land network 86. The data messages are encrypted at vehicle 12 using a public key provided to it by the remote facility. The data messages are then processed (e.g., in a packet-switched protocol, the data message may be split and processed (e.g., encoding and adding headers to the data)) and subsequently sent to remote facility 20 via carrier system 14, cell towers 80, MSCs 82, and land network 86. When the data messages are received at remote facility 20, they may be immediately processed via this method or other methods and/or may be queued until a later time.

The data message may be whole when received, or may be received in parts (such as would occur in packet-switched communications wherein the data message to be communicated is larger than the packet size for the given protocol). Upon arrival, the message may be compiled, processed, and/or decrypted using a cryptographic key. The cryptographic key, as alluded to above, may be a private key that is personal to the remote facility or another private key. The cryptographic key may be complimentary to a public key in a public-key encryptions scheme.

In step 230, after the data message is received and either during or after processing, the data message may be assigned an affiliated identifier (AID). As discussed above, the affiliated identifier may be any string, collection, or array of bytes and does not necessarily have to be unique (i.e. multiple data messages may have the same affiliated identifier). However, for purposes of illustration, in this example, the AIDs for the data messages are unique. The affiliated identifier may be an identifier that is already stored in the database, or may be received as part of the data message. Furthermore, the affiliated identifier may also include a timestamp or any other information that is not necessarily related to the data message, the vehicle that sent the data message, or the remote facility. One such example of such an affiliated identifier is a randomly- or pseudorandomly-generated array of bytes. Alternatively, the affiliated identifier may be a combination of any of the possibilities described above.

Processor 34b of computer 30b may perform operations that are preprogrammed into the computer such that it may generate, compile, recall, or determine the affiliated identifier. After the affiliated identifier is generated, it may be kept in RAM 32b, or may be stored in storage 36b, or another computer's memory and/or storage.

In step 240, a new mapping data entry is created in mapping table 42. A mapping data entry is a data entry (e.g., a data tuple, a data row, a data record) that is stored in mapping table 42 and contains an AID and another ID such as a VID. Additionally, a mapping data entry may contain a checksum and/or other information. The mapping data table may have the "VID" column be the primary key or may have the "AID" column be the primary key, or may have the combination thereof act as the primary key. Additionally, the AID, VID, and a timestamp or other data may act as the primary key for table 42.

Upon determining the affiliated identifier, the computer may extract, or otherwise determine, the vehicle identifier from the data message. Then, the computer will, through a database management system, such as MySQL, insert the mapping data entry into mapping table 42 of database 32b. For example, AID "1XY" and VID "131" may be inserted into mapping table 42, as illustrated. Although a relational database management system is preferable in some embodiments, in other embodiments, other software or system may handle the retrieval, storage, maintenance, and updating of data in the database.

Upon the data entry being inserted into mapping table 42, the data entry process begins, as illustrated in step 250. The purpose of the data entry process is to (1) split the data message into two groups: sensitive data and non-sensitive data; (2) perform the necessary computations in preparing the data entry (or tuple) for insertion into a database table; and (3) insert the data entry into its respective database table.

The data entry process of this embodiment begins with step 260. In this step, the data is split into sensitive and non-sensitive groups. As defined above, sensitive data may be any data or combination of data that when viewed may divulge information that normally would be concealed. Such a "combination of data" may be comprised solely of non-sensitive data, but when viewed with the other data, may reveal information that is sensitive.

There are many different ways to split the data into secure groups. A first being that the data message may flag which data is sensitive and/or which data is non-sensitive. In another embodiment, the computer may merely inspect the data message to determine the fields or type of data therein and then, based on the fields (or columns) of the database tables, deem the data in the data message as non-sensitive or sensitive. For example, if a data message contained the operator's first and last name, the GPS coordinates of the vehicle, and the make of the vehicle, the computer could then sort these fields based on whether the encrypted table or plaintext table have or do not have these fields (or columns). Here, if GPS coordinates and operator names are fields in encrypted table 46, then the computer may determine that this information is sensitive. In yet another embodiment, computer 32b may store a list of fields (e.g., make, model, operator first name, operator last name) or combination of fields (e.g., make and model; operator first name, operator last name, and model year) and whether these fields or combination of fields are sensitive.

Upon splitting the data in step 260, the data entry process may continue to step 270. Here, the data that was deemed to be non-sensitive is inserted into the plaintext table. The data may be inserted as a new record or tuple, or may be used to update one or more fields of already existing data records. Along with the data from the data message that is non-sensitive, other data, such as timestamps and other vehicle information (e.g. vehicle dimensions (e.g., make, model, model year, body type, etc.)), may be inserted into plaintext table 44 as well. The insertion or update of data records may be carried out through a RDBMS or like system that is capable of inserting rows into a database table. For example, a prepared SQL statement may be executed by MySQL (e.g. "INSERT INTO plaintext_table (AID, DIM1, plaintext)" wherein AID, DIM1, and plaintext are variables used by the prepared statement and plaintext_table is plaintext table 44). In such an example, AID "1XY", DIM "2014, GMC, Terrain", and plaintext "12.13 V, Model ETX30L" may be inserted into plaintext table 44.

In step 272, a checksum of the data tuple or, at least, part thereof is computed. A checksum is a string of bytes or characters that functions as a source of integrity verification. For example, a checksum may be computed on a set of data, such as a data tuple of plaintext table 44, and, later, another checksum may be computed and compared to the previous checksum to ensure that the data was not modified. Checksums can also be used to ensure what is communicated is what it is purported to be.

Here, a checksum may be computed using the plaintext column for the previously entered row ("12.13 V, Model ETX30L") as its input. Common checksums include MD5, SHA-1, SHA-2, and any of these, or any other suitable hash function or algorithm, may be used by computer 30b to compute the checksum of the plaintext data. After the checksum is performed, it may be stored locally by computer 30b or sent to a database server. It should be appreciated that this step may occur before entering the data tuple into plaintext table 44 as described in step 270.

In step 274, the checksum is inserted into mapping table 42. This may be performed in any suitable manner, including those described above with respect to steps 240 and 270. Here, unlike in steps 240 and 270, an update will be performed as opposed to an insert. However, in other embodiments, an insert or other statement may be used. As shown in table 42, the checksum "9TajP02z" had been inserted; however, it should be appreciated that this is merely an example and that many checksums are longer than 8 characters (e.g. 32 characters, as is generated by the MD5 algorithm). It should be appreciated that this step may occur before entering the data tuple into plaintext table 44 as described in step 270, but must occur after step 272.

After entry of the checksum into the identifier mapping table, this table may be encrypted and saved to a non-volatile medium for purposes of maintaining an up-to-date backup. As stated in step 210, the illustrated embodiment utilizes a symmetric key encryption scheme for mapping table 42. Therefore, the first cryptographic key, as was used for decryption in step 210, is used for encryption of the mapping table. The mapping table may be encrypted using the first cryptographic key by computer 30b, a database server, or another computer. In the case of computer 30b carrying out the encryption, processor 34b may perform the encryption using RAM 32b and storage 36b as necessary. The encrypted mapping table may then be stored to a storage device, such as device 36b, or another storage device such as a hard disk drive or solid state drive that is dedicated to storing the database.

Synchronously with steps 270-276, steps 280-282 may be carried out either by another computer (e.g., 30a or 30c), computer 30b, or another device. In step 280, at least part of the data to be inserted into the encrypted table is encrypted. As shown, the "AID" and the "DIM" (or dimension) columns are not encrypted; but, the "Cypher Text" column is. There may be one or more columns that are to contain encrypted data (e.g., "Cypher Text 2", "Cypher Text 3"). The sensitive data is encrypted using a second cryptograph key (i.e. not the same key as the first cryptographic key; however, this is possible). The second key can be a public key (as used in a public key encryption scheme) or a private key (as used in either a public key or symmetric encryption scheme). The encryption algorithm may be any suitable encryption algorithm, such as RSA, AES (advanced encryption standard), Triple DES (data encryption standard), Blowfish, or Twofish. Computers 30a-c may carry out the encryption using their respective RAM, processor, and storage. Additionally, a salt (i.e. random data) may be prepended or appended to the data before it is encrypted. This may allow for heightened protection against dictionary or rainbow attacks. The salt can then be stored in the encrypted table in its own column.

After the data is encrypted, step 282 may be carried out. In this step, the encrypted date from step 280, the AID, and one or more DIM values are inserted into the encrypted table. Additionally, metadata, timestamp(s), or any other data may be entered into database 40b. As described above with respect to steps 240 and 270, the data may be inserted using a prepared statement that is executed by a RDBMS such as MySQL. Upon insertion of this data record into the encrypted table, method 200 then ends. The method however may be continuously carried out and may restart at step 220 in cases where the mapping table is already decrypted and stored in RAM.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of operating a database stored on one or more database servers, wherein each of the one or more database servers are located at a remote facility and includes an electronic processor and non-volatile, computer-readable memory containing at least part of the database, wherein the database comprises:
    an identifier mapping table that contains mapping data entries wherein each mapping data entry associates a unique identifier with an affiliated identifier;
    a plaintext table that contains non-sensitive data entries; and
    an encryption table that contains sensitive data entries;
wherein the remote facility includes at least one computer that is capable of carrying out the method steps, wherein each computer includes an electronic processor, wherein each computer is configured to decrypt the identifier mapping table using a first encryption key, and wherein the method comprises the steps of:
    (a) receiving a data message, wherein the data message contains a unique identifier;
    (b) providing an affiliated identifier to be associated with the unique identifier;
    (c) encrypting sensitive data using a second encryption key, wherein the sensitive data includes data from the data message or data pertaining to or derived from the data message;
    (d) storing non-sensitive data and the affiliated identifier in the plaintext table and storing the encrypted sensitive data and the affiliated identifier in the encrypted table, wherein the non-sensitive data includes data from the data message or data pertaining to or derived from the data message;
    (e) storing a new mapping data entry in the identifier mapping table, wherein the new mapping data entry contains the unique identifier and the affiliated identifier;
    (f) encrypting the identifier mapping table using the first encryption key; and
    (g) writing the encrypted identifier mapping table to the non-volatile, computer-readable medium.

2. The method of claim 1, wherein the unique identifier contains a vehicle identifier, a vehicle module identifier, a personal identifier, or any combination thereof.

3. The method of claim 2, wherein the unique identifier further contains a timestamp.

4. The method of claim 1, wherein the data message that is received in step (a) is encrypted and further comprising the step of decrypting at least part of the data message subsequently after the data message is received.

5. The method of claim 1, further comprising the step of loading the identifier mapping table into random access memory.

6. The method of claim 5, further comprising the step of decrypting the identifier mapping table.

7. The method of claim 1, wherein a salt is prepended or appended to the at least part of the data message before encrypting using the second encryption key.

8. The method of claim 1, wherein the affiliated identifier is randomly or pseudorandomly generated.

9. The method of claim 1, wherein the data message includes both the sensitive data and the non-sensitive data.

10. The method of claim 9, wherein the sensitive data is selected to be stored in the encrypted table and the non-sensitive data is selected to be stored in the plaintext table.

11. The method of claim 1, further comprising the step of generating a checksum from at least part of the plaintext data entry after storing at least part of the data message into the plaintext table.

12. The method of claim 11, wherein the new mapping data entry contains the checksum that was generated in the generating step.

13. A database system, comprising:
    a database stored on a computer-readable medium that is included as a part of one or more database servers, comprising:
        an encrypted table, wherein the encrypted table contains a plurality of sensitive data entries, wherein each sensitive data entry contains sensitive information and is in an encrypted format;
        a plain-text table, wherein the plain-text table contains a plurality of non-sensitive data entries, wherein each non-sensitive data entry is in a plaintext form; and
        an identification mapping table, wherein the identification mapping table contains a plurality of mapping data entries, wherein each mapping data entry associates a unique identifier to an affiliated identifier that is used to recall data from the encrypted table and the plain-text table;
    a computer, wherein the computer comprises a processor, memory, and a computer-readable medium; and
    an application that is stored on the computer, wherein the application manages input and output operations performed by the computer for the database in response to receiving data;
    wherein the application, when executed by the processor, causes the computer to:
        receive a data message, wherein the data message contains a unique identifier;
        provide an affiliated identifier to be associated with the unique identifier;
        encrypt sensitive data using a second encryption key, wherein the sensitive data includes data from the data message or data pertaining to or derived from the data message;
        store the encrypted sensitive data and the affiliated identifier in the encrypted table;
        store non-sensitive data and the affiliated identifier in the plaintext table, wherein the non-sensitive data includes data from the data message or data pertaining to or derived from the data message;
        store a new mapping data entry in the identifier mapping table, wherein the new mapping data entry contains the unique identifier and the affiliated identifier;
        encrypt the identifier mapping table using the first encryption key; and
        write the encrypted identifier mapping table to the non-volatile, computer-readable medium.

14. A method of operating a database stored on one or more non-volatile, computer-readable memory devices that are accessible by one or more computers, wherein each of the one or more computers includes an electronic processor and computer-readable memory, wherein the one or more computers are configured to carry out the method, wherein the database comprises: an identifier mapping table that contains mapping data entries wherein each mapping data entry associates a unique identifier with an affiliated identifier; a plaintext table that contains non-sensitive data entries; and an encryption table that contains sensitive data entries; and wherein the method comprises the steps of:

(a) decrypting the identifier mapping table using a first cryptographic key;

(b) receiving a plurality of data messages via a land network and a cellular carrier system from a vehicle, wherein the data message contains a unique identifier that uniquely identifies the vehicle, and wherein the data messages contain sensitive data and non-sensitive data;

(c) for each of the received data messages, obtaining an affiliated identifier to be associated with the unique identifier, wherein the affiliated identifier is unique to each of the plurality of data messages received;

(d) encrypting the sensitive data using a second cryptographic key, wherein the sensitive data includes data from the data message or data pertaining to or derived from the data message;

(e) storing the encrypted sensitive data and the affiliated identifier in the encrypted table;

(f) storing the non-sensitive data and the affiliated identifier in the plaintext table, wherein the non-sensitive data includes data from the data message or data pertaining to or derived from the data message;

(g) storing a new mapping data entry in the identifier mapping table, wherein the new mapping data entry contains the unique identifier and the affiliated identifier; and (h) encrypting the identifier mapping table using the first cryptographic key.

15. The method of claim 14, further comprising the step of generating a checksum from at least part of the plaintext data entry.

16. The method of claim 15, wherein the new mapping data entry contains the checksum that was generated in the generating step.

* * * * *